Dec. 18, 1923.
A. TROWBRIDGE ET AL
CAMERA
Original Filed Oct. 5, 1920  4 Sheets-Sheet 1
1,477,674
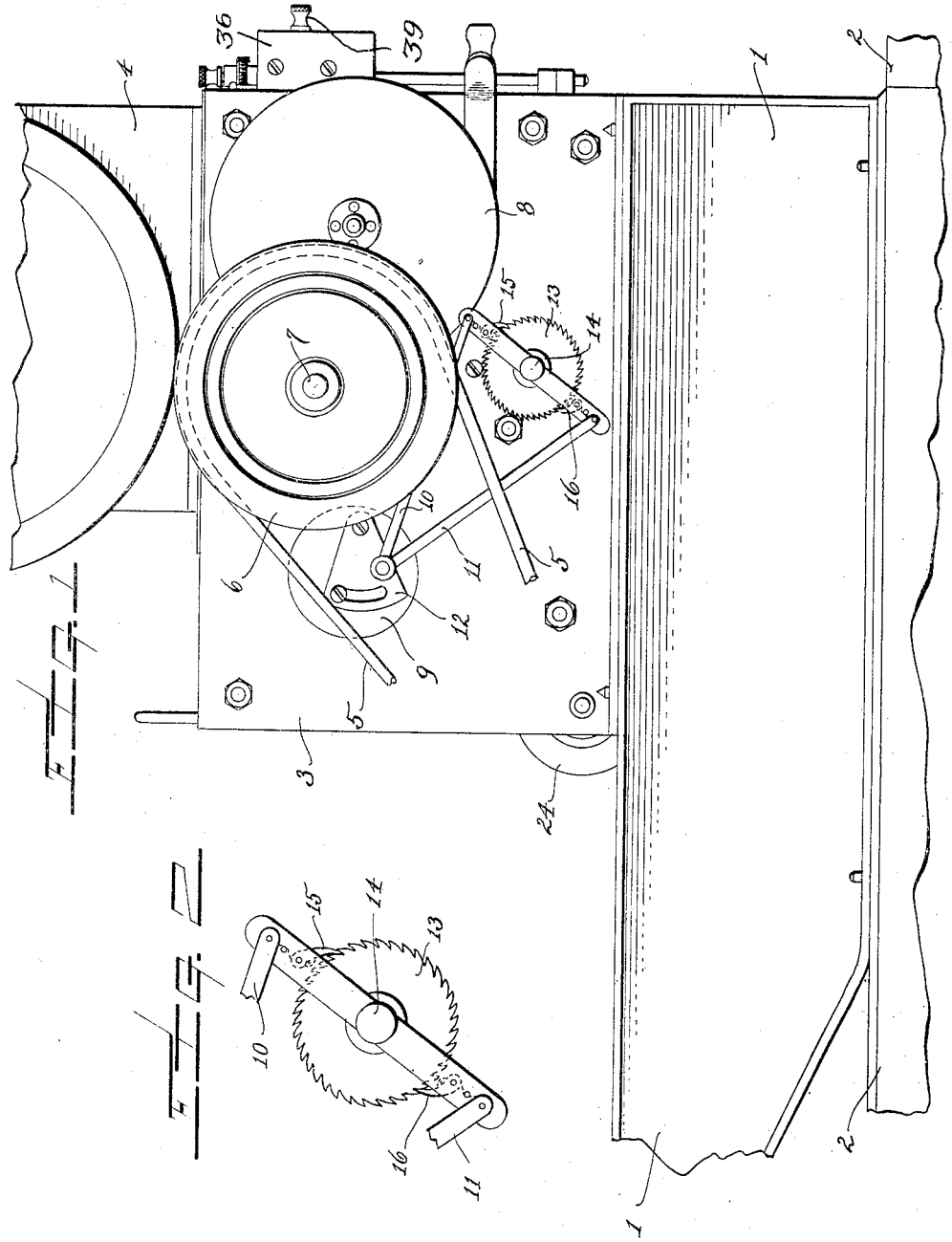
INVENTORS
AUGUSTUS TROWBRIDGE
AND WILLIAM C. DURYEA.
BY
Howard W. Dix
ATTORNEY.

Dec. 18, 1923.
A. TROWBRIDGE ET AL
1,477,674
CAMERA
Original Filed Oct. 5, 1920   4 Sheets-Sheet 2
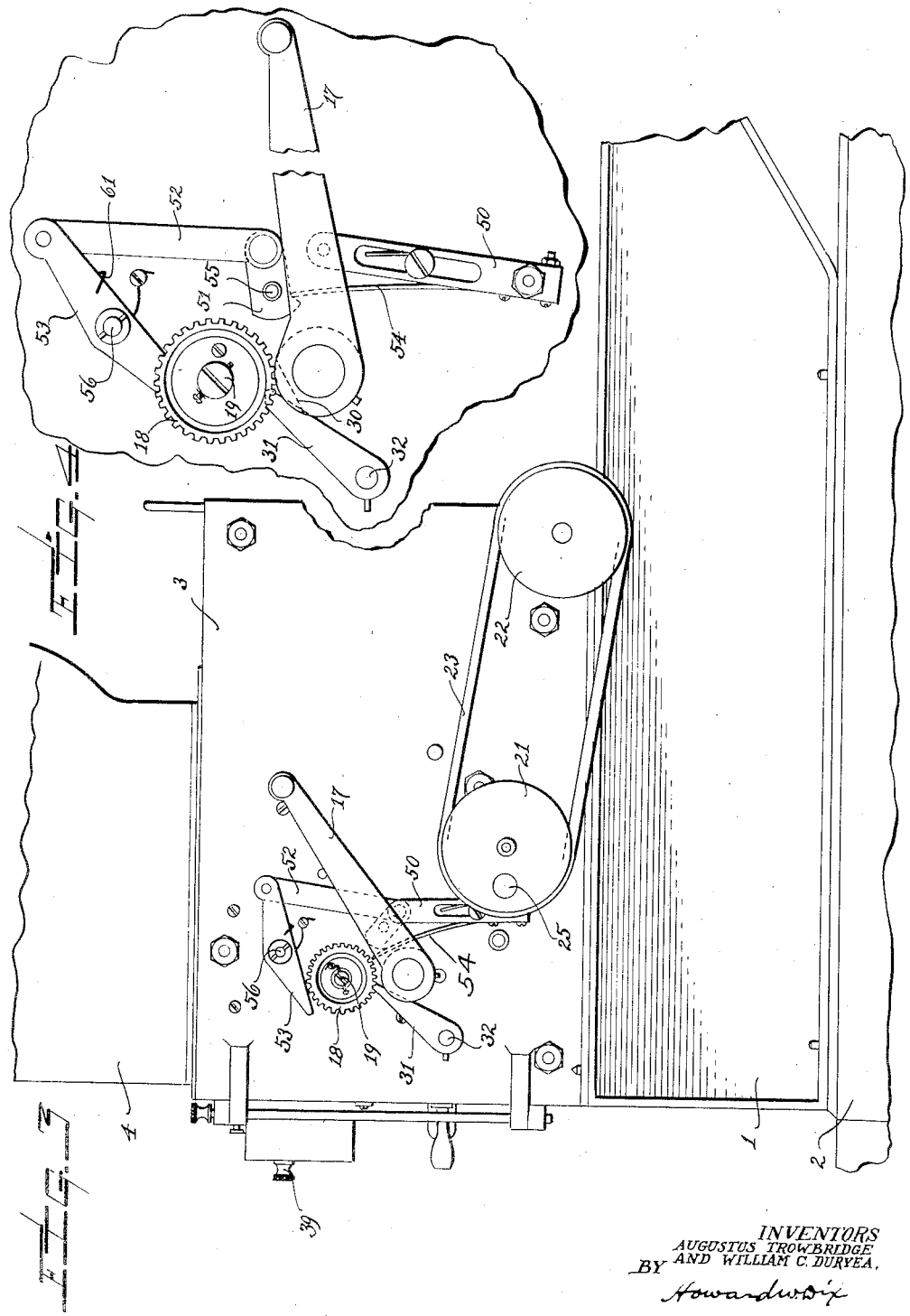
INVENTORS
AUGUSTUS TROWBRIDGE
AND WILLIAM C. DURYEA,
BY Howard Wix
ATTORNEY.

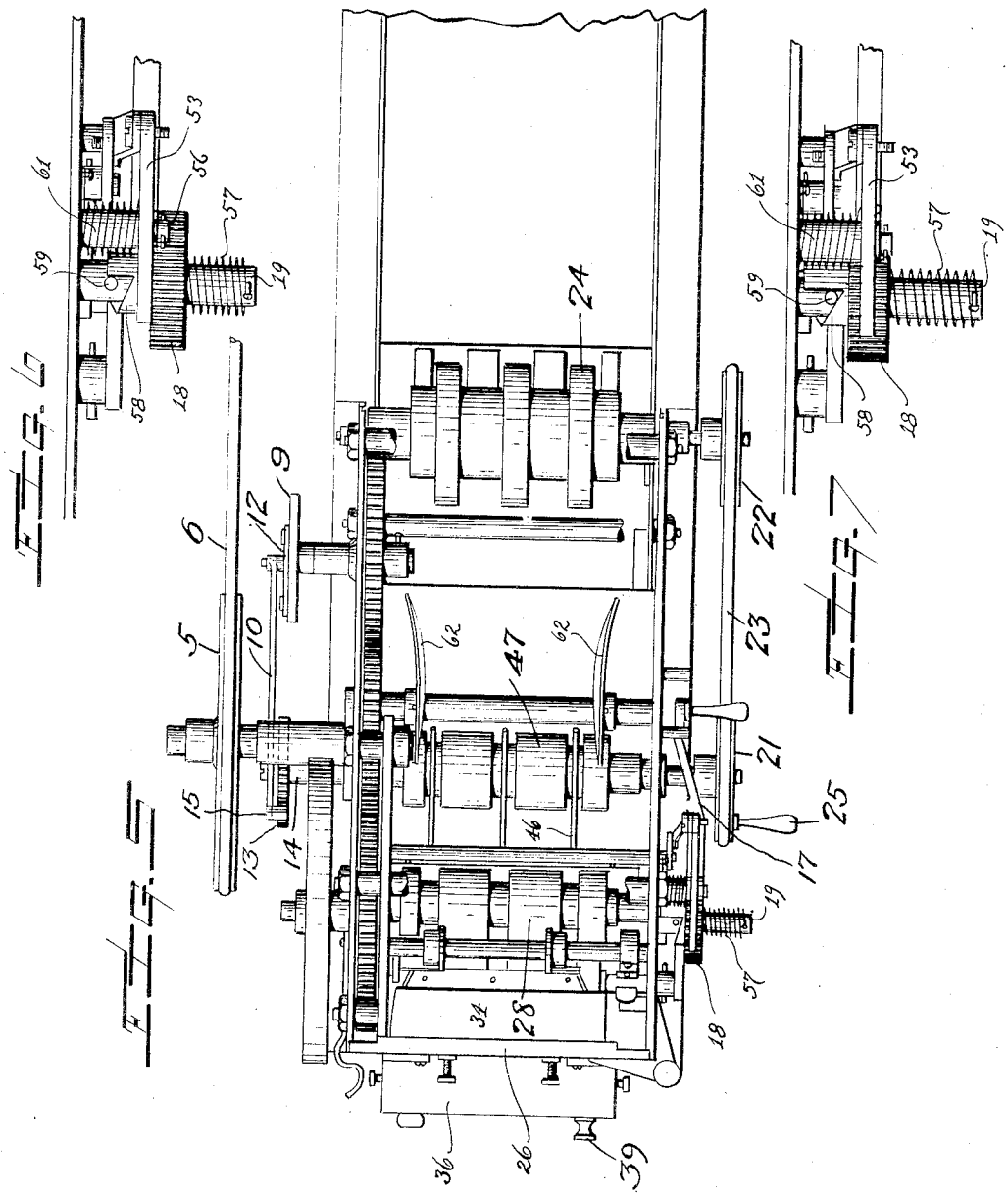

Dec. 18, 1923.    A. TROWBRIDGE ET AL    1,477,674
CAMERA
Original Filed Oct. 5, 1920    4 Sheets-Sheet 4
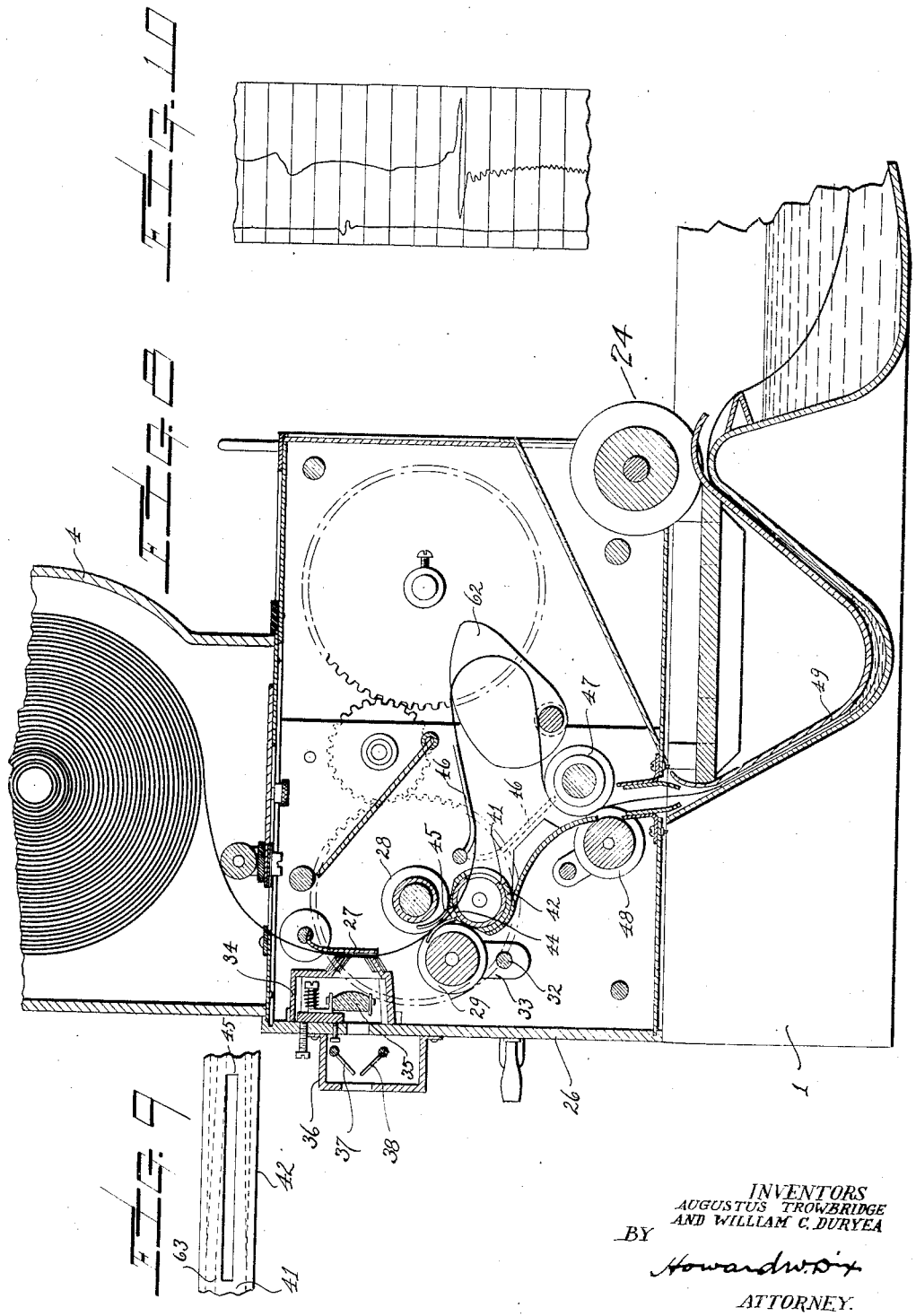
INVENTORS
AUGUSTUS TROWBRIDGE
AND WILLIAM C. DURYEA
BY
Howard W. Dix
ATTORNEY.

Patented Dec. 18, 1923.

1,477,674

UNITED STATES PATENT OFFICE.

AUGUSTUS TROWBRIDGE AND WILLIAM C. DURYEA, OF PRINCETON, NEW JERSEY.

CAMERA.

Original application filed October 5, 1920, Serial No. 414,742. Divided and this application filed January 30, 1922. Serial No. 532,591.

*To all whom it may concern:*

Be it known that we, AUGUSTUS TROWBRIDGE and WILLIAM C. DURYEA, citizens of the United States, and residents of Princeton, in the county of Mercer and State of New Jersey, have invented certain new and useful Improvements in Cameras, of which the following is a specification.

This invention relates to photography and in particular it relates to a combined apparatus for exposing and developing a film or sensitized paper.

One of the main objects of this invention is to provide a new and improved means for exposing a film or sensitized paper and for issuing the same from the apparatus in developed condition and ready to be observed and handled.

Another important object is the provision of an improved means for exposing a film at a desired speed and for developing it at another or equal speed.

A further object is the provision of a unit apparatus, functioning as a camera and a developing means, which automatically stores the exposed film before it is guided into developing liquids where it is treated at a rate of speed different from the speed of exposure.

Another and important object of the invention is to provide an automatic means for threading the film through the apparatus and for properly guiding the film during the normal operations of the machine.

Other objects will be readily appreciated upon a reading of the detailed description.

This invention is divided from our co-pending application for improvements in recording indicators, filed October 5, 1920, Serial Number 414742. That application discloses an apparatus for indicating and recording the operations of various machines wherein the co-operation of the machine parts and the existing conditions therein are not readily perceived and retained by the human senses. The machine is especially adapted for use in scientific investigations to record various conditions of operations. The particular adaptation of the indicator in the above mentioned application is described in connection with the indicating and recording of the gas pressures at any instant in an internal combustion engine.

In this divisional case, the exposing and developing unit or camera will be described as a means for recording indications representative of the gas pressures in an internal combustion engine. For convenience in the description and for ready understanding, the term camera will be applied to an apparatus adapted to expose and develop a film, and the term film will be understood as including the ordinary celluloid film, sensitized paper or other means adapted to record indications or scenes.

The accompanying drawings illustrate the camera as adapted for use with the recording of pressure indications described in the application from which this one is divided. In these drawings, Figure 1 is an elevational view of a camera;

Figure 2 is a view in detail of adjustable power transmitting parts of the camera;

Figure 3 is an elevational view of the opposite side of the camera;

Figure 4 is an enlarged view of the apparatus mounted on the side of the camera shown in Figure 3 but in its second operating position;

Figure 5 is a top plan view of the camera with the top thereof removed;

Figures 6 and 7 are views of part of the apparatus shown in Figures 4 and 5 in different operating positions.

Figure 8 is a sectional view of the camera;

Figure 9 is a front view of a cutter which is mounted near driving rollers; and

Figure 10 is a facsimile of a portion of the film after passing through the camera.

Referring now to these drawings and particularly to Figure 1, the camera preferably consists of a tank 1 mounted on a base 2, a light-proof container 3 for carrying the operating parts of the apparatus, and a film magazine 4, suitably positioned on top of the container. Power is supplied to the apparatus by means of a motor (not shown) through a belt 5 operating on pulley 6 for driving a main shaft 7. A fly wheel 8 operated by the main shaft through a series of gears maintains the moving parts of the apparatus at uniform speeds. Referring also to Figure 1, there is shown a suitable off-center apparatus for transmitting power at a reduced speed to a set of rollers located in the lower part of the container. This apparatus preferably consists of a rotating blank wheel 9 driven by gears operated from the main shaft, levers 10 and 11 adjustably positioned off center on the blank by means of a movable quadrant 12, and a toothed wheel 13 mounted on a shaft 14 carrying one of the rollers driven by the levers 10 and 11 operating through engaging pawls 15 and 16, as shown in detail in Fig. 2. The pawls 15 and 16 are carried by independent arms which are loosely mounted on shaft 14, and each of these arms is responsive to the movement of the lever 10 or 11 to which it is attached. The speed of the roller is increased or decreased by moving the pivoted ends of the levers away from or toward the center of the blank wheel 9.

Referring to Fig. 3, the apparatus mounted on the opposite outside surface of the container 3 consists of a main operating handle 17 for throwing some of the operating parts of the camera into and out of operation, a wheel 18 slidably carried on a shaft 19 which also carries one of the driving rollers for moving the film, and pivoted levers which operate with the movement of the operating handle to throw certain parts of the apparatus into operating position. Suitable pulleys 21 and 22 connected by a belt 23 transmit power to a guiding roller 24 (see Fig. 1) which assists in moving the film through suitable developer and fixing baths. A handle 25 mounted on roller 21 is provided to manually rotate the guiding roller when desired.

Referring now particularly to Figs. 5 to 8 inclusive, a description of the operation of the camera will be made while following the path of the film through the camera. A door 26 pivoted on the container 3 is opened and the film drawn from the magazine down across an oscillating spring biased guide 27 and into contact with a driving roller 28. The operating handle 17 is then moved to its "up" position moving a second driving roller 29 against the film thereby firmly engaging the same between the rollers which in normal operation draw it from the magazine. The apparatus for moving this second driving roller to non-engaging position preferably consists of a suitable cam 30 (see Fig. 4) formed on the hub of the operating handle, a lever 31 which is moved backward by cam 30 to rotate shaft 32, and a lever 33 (Fig. 8) upon which the roller 29 is mounted. The roller 29 is moved into engaging position by a suitable spring (not shown) which may engage either lever 31 or lever 33.

After the film has been properly threaded between the driving rollers, the door is closed and a guard 34 surrounding lens 35 mounted in the door moves its velvet covered edges into contact with the film and presses the same against the guide 27 thus making the enclosure between the door and the interior of the container light-proof. A second guard 36 held on the front of the door carries oscillating plates 37 and 38 which are movable by thumb screw 39 (see Fig. 3) to increase or decrease the width of the light beam admitted to the lens 35.

The movement of the operating handle to its "up" position oscillates an apertured cylinder 41 mounted in a cylindrical tapering seat form by a second apertured cylinder 42 (see Fig. 9) so that apertures 44 and 45 register and permit the film as moved by the driving rollers to pass there-through into contact with a guiding fork 46 shown in its lower or "down" position in dotted lines. This fork guides the end of the film from the driving rollers to a second set of rollers 47 and 48, and is maintained in its lower position until the film is caught by these lower rollers, when it is automatically thrown to its "up" position, represented in full lines, and the film is then allowed to double back on itself, as shown in full lines, and to thus be stored within the container until the lower rollers draw the same forward and move it through developer and fixing liquids maintained in the tank. Proper guiding means such as a V-shaped guide 49 is held in the tank 1 to guide the film through the developing fluids. Within the scope of proper guiding means mentioned we desire it to be understood that the guide 49 may be liquid tight thereby permitting the use of a small amount of chemical to give the maximum length of travel of the film through the chemical, that is, when a liquid tight guide is placed in one of the tank compartments as shown in Fig. 8, the liquid rises in the space between the compartment wall and the guide as the lower end of the guide is constructed to be positioned below the normal level of the chemical. Thus the chemical is forced to a higher level between the wall and the guide. By reason of the position of the light-proof container above the tank, the guide is prevented from floating on the chemical, or if desired the weight of the guide may be made such that it will not float on the liquid. From the above description it will be noted that the camera exposes the film at one rate of speed and develops it at another rate, this last rate of speed being variable by means of the apparatus above described.

Referring now to Figs. 3, 4, 6, and 7, the operation of the guiding fork and its mechanism will be set forth. Preferably this guiding fork is thrown to its "down" position by the upward movement of the operating handle 17 and is automatically moved to its "up" position after the power has been applied to the camera for a definite period of time. The mechanism required to move the fork to its "down" position preferably consists of a train of levers 50, 51, 52 and 53 and wheel 18. The upward movement of the handle carries lever 50 upward and a leaf spring 54 attached to the lever rotates the second lever 51 on its shaft 55 and pulls down lever 52 which, being attached to the end of the fourth lever 53, rotates the same about its pivot 56, and moves its free end upward out of contact with the side of wheel 18. The fork is mounted on shaft 55. The wheel 18 is mounted on shaft 19 carrying one of the driving rollers and is biased by a spiral spring 57 to a position near the side of the container. This wheel has on the end of its hub a cam 58 which engages a pin 59 carried in the shaft. The end of the fourth lever engages the top or circumferential surface of the wheel when the fork has been moved to its "down" position, and the levers are in positions shown in Figs. 3 and 7. When the power is applied, pin 59 moves in contact with the cam 58 forcing the wheel outward and compressing spring 57 until the pin reaches the end of the cam, at that instant the fourth lever moves out of contact with the circumferential surface of wheel 18 and is thrown by spring 61 against the hub of the wheel and into contact with the side of said wheel to maintain the same in its outer position. The spring 61 mounted on the pivot of the fourth lever is of sufficient strength to throw the other attached levers to their normal positions and to rotate the fork to its "up" position, as shown in full lines in Fig. 8. The positions of the levers after being moved are shown in Figs. 4 and 6. When the fork is in "up" position the film is permitted to double back on itself between guides 62 and is later drawn between the lower rollers and moved into the developing fluids.

When the operating handle is moved to its "down" position to stop the downward movement of the film by moving the second driving roller out of contact with the first one, a sharp edge 63 formed at an angle to the aperture 45 (see Fig. 9) is progressively moved against the other apertured cylinder 42 thereby cutting the film. The remaining parts of the apparatus continue to operate until the lower rollers have moved the film held in storage through the developer and fixing baths and the guiding roller 24 has moved the film from the developer solution.

In Fig. 10 there is illustrated a portion of the film as it issues from the fixing bath of the camera. The particular curves shown on the film represent the conditions of pressure of gas in the engine and are capable of being interpolated into pounds per square inch at any instant of operation.

In a camera of the nature herein described, it is to be understood that it may be modified to permit the film to be exposed under different conditions such as, different size aperture openings, varied speed of film or interrupted movement of the film. In fact any of the well known moving picture exposing devices may be employed to expose the film in a desired manner. However it is to be appreciated that any apparatus which exposes the film at one rate of speed and develops it at another speed comes within the scope of our invention which is outlined in the following claims.

What is claimed is:

1. A camera comprising a light proof container provided with a light admitting aperture, a film carrying magazine associated with said container, a tank also associated with said container and being provided with a plurality of receptacles for chemicals for developing the film, a moving means mounted in said container and arranged to grasp the film to draw it from said magazine and to move it in front of said light admitting aperture, and a second moving means capable of being adjusted to any of several speeds for moving said film from said container to said tank.

2. In a camera adapted to have a continuous film moved therethrough, a container provided with a light admitting aperture, a film carrying magazine associated with said container, a tank also associated with said container and being provided with receptacles for developing fluids, a driving means arranged to move the film from said magazine and to continuously pass the film in front of said light admitting aperture at a definite speed, a second driving means arranged to move said film from said container to said tank at a speed which is different from the speed at which it passes said aperture.

3. A camera comprising a container provided with a light admitting aperture, a film carrying magazine associated with said container, a tank also associated with said container and being provided with a plurality of receptacles for developing fluids, a driving means in said container arranged to grasp the film to draw it from said magazine and to move it in front of said light admitting aperture, a second driving means for moving said film from said container to said tank, and a mechanism associated with said second driving means for governing its speed of movement thereby controlling the speed at which the film passes to the developing fluids.

4. A camera comprising a container provided with a light admitting aperture, a film carrying magazine associated with said container, a tank also associated with said container and being provided with a plurality of receptacles for developing fluids, means for moving the film in front of said light admitting aperture, a second means arranged to grasp said film while it is dry and push the same into and through the fluid in one of the receptacles of said tank, and means in said receptacle for guiding the movement of said film as it passes therethrough.

5. A camera comprising a container provided with a light admitting aperture, a film carrying magazine associated with said container, a tank also associated with said container and being provided with a plurality of receptacles for developing fluids, means for moving the film in front of said light admitting aperture, a second means arranged to grasp said film while it is dry and push the same into and through the fluid in one of the receptacles of said tank, and a non-moving guide positioned in said receptacle and forming with the walls thereof a channel through which the film is pushed, the developing fluid also being included within this channel.

6. A camera comprising a container provided with a light admitting aperture, a film carrying magazine associated with said container, a tank also associated with said container and being provided with a plurality of receptacles for developing fluids, a moving means arranged to move said film from said magazine and in front of said light admitting aperture, a second moving means capable of having its speed adjusted and being arranged to move the film through the fluid in one of the receptacles in said tank, and a roller having its peripheral speed in synchronism with the linear speed of movement of the film through said receptacle and being so associated with said tank and said film that it will move the film into and through a second receptacle.

7. A camera comprising a container provided with a light admitting aperture, a film carrying magazine associated with said container, a tank also associated with said container and being provided with a plurality of receptacles for developing fluids, a pair of rollers adapted to grasp said film to draw it from said magazine and to move it in front of said light admitting aperture, a second pair of rollers for engaging the film to move it from said container and into one of the receptacles of said tank, a single roller cooperating with said film and said tank to move the film from one receptacle to another, and a mechanism associated with said second pair of rollers and with said single roller for adjusting their speeds of rotation.

8. A camera comprising a container provided with a light admitting aperture, a film carrying magazine associated with said container, a tank also associated with said container and being provided with a plurality of receptacles for developing fluids, a pair of rollers, one being movable relatively to the other and arranged to cooperate with the other to draw the film from said magazine and to move it in front of said light admitting aperture a spring pressed member adapted to engage said film to maintain it in close proximity with said aperture, a cutting means carried by said container and positioned near said rollers and being so constructed as to cut said film in a progressive manner, and a second pair of rollers for engaging said film to move it from said container to said tank, said second pair of rollers adapted to be rotated at a speed different from that of said first pair.

9. A camera comprising a container provided with a light admitting aperture, a film carrying magazine associated with said container, a tank also associated with said container and being provided with a plurality of receptacles for developing fluids, means for moving said film from said magazine and in front of said aperture, a second means adapted to grasp said film to move it from said container to said tank at a speed less than that at which it is moved into said container, and a movable member for guiding said film from said first moving means to said second moving means and to then be automatically and positively moved to a definite second position thereby permitting the film to double up on itself in a suitably provided storage space and to remain therein until drawn out by said second moving means.

10. A camera comprising a container provided with a light admitting aperture, a film carrying magazine associated with said container, a tank also associated with said container and being provided with a plurality of receptacles for developing fluids, means for moving said film from said magazine and in front of said aperture, a second means adapted to grasp said film to move it from said container to said tank at a speed less than that at which it is moved into said container, a movable member for guiding said film from said first moving means to said second moving means and adapted to be moved to a second position after a predetermined time, and a mechanism set in operation at the same time as said first moving means for positively moving said movable member to its second position.

11. A camera comprising a container provided with a light admitting aperture, a film carrying magazine associated with said container, a tank also associated with said container and being provided with a plurality of receptacles for developing fluids, means for moving said film from said magazine and in front of said aperture, a second means adapted to grasp said film to move it from said container to said tank at a speed less than that at which it is moved into said container, a fork member pivoted near said first moving means and having its free ends extending into grooves formed in said second moving means and adapted while in this position to guide said film from said first moving means to said second moving means, and a mechanism having a cam included therein and being so arranged as to move said fork member to a second position after a predetermined interval of operation during which said cam operates to reposition some of the parts of said mechanism.

12. A camera comprising a container provided with a light admitting aperture, a film carrying magazine associated with said container, a tank also associated with said container and being provided with a plurality of receptacles for developing fluids, a pair of rollers one of which may be oscillated to and from the other and being so constituted that when in close proximity to each other they grasp said film to draw it from said magazine and move it in front of said light admitting aperture, a second pair of rollers arranged to grasp said film after it has been exposed and to push it into said tank, a fork member so positioned in said container that it guides said film after exposure to said second pair of rollers, and a mechanism having included therein a series of levers and a cam and being so connected to said fork member that after a predetermined operation of said levers and said cam the fork member is moved to a second position to allow excess amounts of said film to pass in a circuitous path before said second pair of rollers passes it into said tank.

13. A camera comprising a container provided with a light admitting aperture, a film carrying magazine associated with said container, a tank also associated with said container and being provided with a plurality of receptacles for developing fluids, a lens positioned in front of said aperture, adjustable means located in front of said aperture and said lens for controlling the size of a light beam passing through said aperture and said lens, a pair of rollers for moving said film from said magazine and in front of said aperture, and a second pair of rollers moving at a different speed than that of said first pair for grasping said film and moving it from said container to said tank.

14. A camera comprising a light proof container, a film carrying magazine associated with said container, a tank also associated with said container and being provided with a plurality of receptacles for developing fluids, a door in one side of said container and constructed to have a light admitting aperture formed therein, a lens carried by said door in proximity to said aperture, means mounted on said door for governing the amount of light passing through said aperture, a frame also mounted on said door and being provided with an opening registering with said aperture and adapted to have said film move by said opening and in contact with the edges of said frame, power driven means for moving said film from said magazine and past said opening at a predetermined speed, and a second power driven means for engaging said film to move it into said tank.

15. A camera comprising a container provided with a light admitting aperture, a film carrying magazine associated with said container, a tank also associated with said container and being provided with a plurality of receptacles for developing fluids, moving means for engaging said film to draw it from said magazine and move it in front of said aperture, a second moving means for passing said film into said tank to be developed and being so constituted that it may be adjusted to move at any of several speeds, and means for cutting said film consisting of a pair of cylinders concentrically assembled and positioned in said container near said first moving means, said cylinders arranged to have the film pass into them through two registering apertures and to pass from them through two other registering apertures, and a handle for moving the cylinders relatively to each other to cause them to cut said film.

16. A camera comprising a container provided with a light admitting aperture, a film carrying magazine associated with said container, a tank also associated with said container and being provided with a plurality of receptacles for developing fluids, moving means for engaging said film to draw it from said magazine and move it in front of said aperture, a second moving means operating at a slower speed than said first moving means for passing said film from said container into said tank, and means associated with said container for cutting said film, said means consisting of members concentrically assembled in engagement with each other and being so constructed that openings in each register with each other to allow said film to pass into said members and each member being provided with other and larger openings which register and allow the film to pass from said members, one of the first mentioned openings being constructed to have its width increase with its length, and a handle for causing one of said members to be moved relatively to the other so as to move the first mentioned openings out of registry thereby allowing the edges of the cylinders at said openings to cut said film in a progressive manner by reason of the increasing width of one of said openings.

17. A camera comprising a container provided with a light admitting aperture, a firm carrying magazine associated with said container, a tank also associated with said container and being provided with a plurality of receptacles for developing fluids, means for moving said film from said magazine and in front of said aperture, a source of power for driving said means, a central handle for placing said moving means in and out of effective operation in relation to moving said film, a second moving means driven from the same source of power and capable of being adjusted as to its speed of operation and being arranged to grasp said film and pass it from said container into said tank, and a roller adapted to engage said film to pass it from one receptacle to another, said roller being driven in synchronism with said second moving means.

18. In a camera having a light-proof container provided with an aperture, film driving rollers mounted in said container, an operating handle mounted on the side of said container and adapted to move one of said driving rollers against the other roller for positively engaging said film, a power means for operating said rollers, a second set of rollers driven by said power means at a different speed, a guiding fork conducting said film from said driving rollers to the second set of rollers and adapted to be moved into said guide position when the movable roller of said driving rollers is moved into positive contact with said film, and means for throwing said fork to a second position after said film has been engaged by said second set of rollers to guide said film to a storage space.

19. In a camera having a light-proof container with an aperture formed therein for admitting light, driving rollers for moving a sensitized film in front of said aperture, one of said driving rollers arranged to have relative movement to the other by the operation of a handle mounted on the exterior of said container, a cutting means held in said container and adapted to be opened by the movement of said handle to move said driving roller against the other and to permit said film to be passed between said cutting edges during normal movement of said film, and a second set of rollers for moving said film out of said container, the movement of said handle in the opposite direction causing said cutting edges to close together to cut the film and causing said movable driving roller to be moved away from its co-operating roller to stop the movement of said film in front of said aperture.

20. In a camera having a film carrying magazine, a light-proof container provided with an aperture, driving rollers for moving a film in front of said aperture, a cutting means for severing said film after it has passed said aperture, a second set of rollers for moving said film out of said container at a reduced speed, a guiding means for directing said film to said second set of rollers and then to be automatically oscillated to another position, a tank with a plurality of compartments for film developing chemicals, non moving guides in said compartments for directing said film through said chemicals, and a power driven roller for moving said film from one chemical to another.

Signed at Princeton in the county of Mercer and State of New Jersey this 23rd day of January A. D. 1922.

AUGUSTUS TROWBRIDGE.
WILLIAM C. DURYEA.